Figure 1:
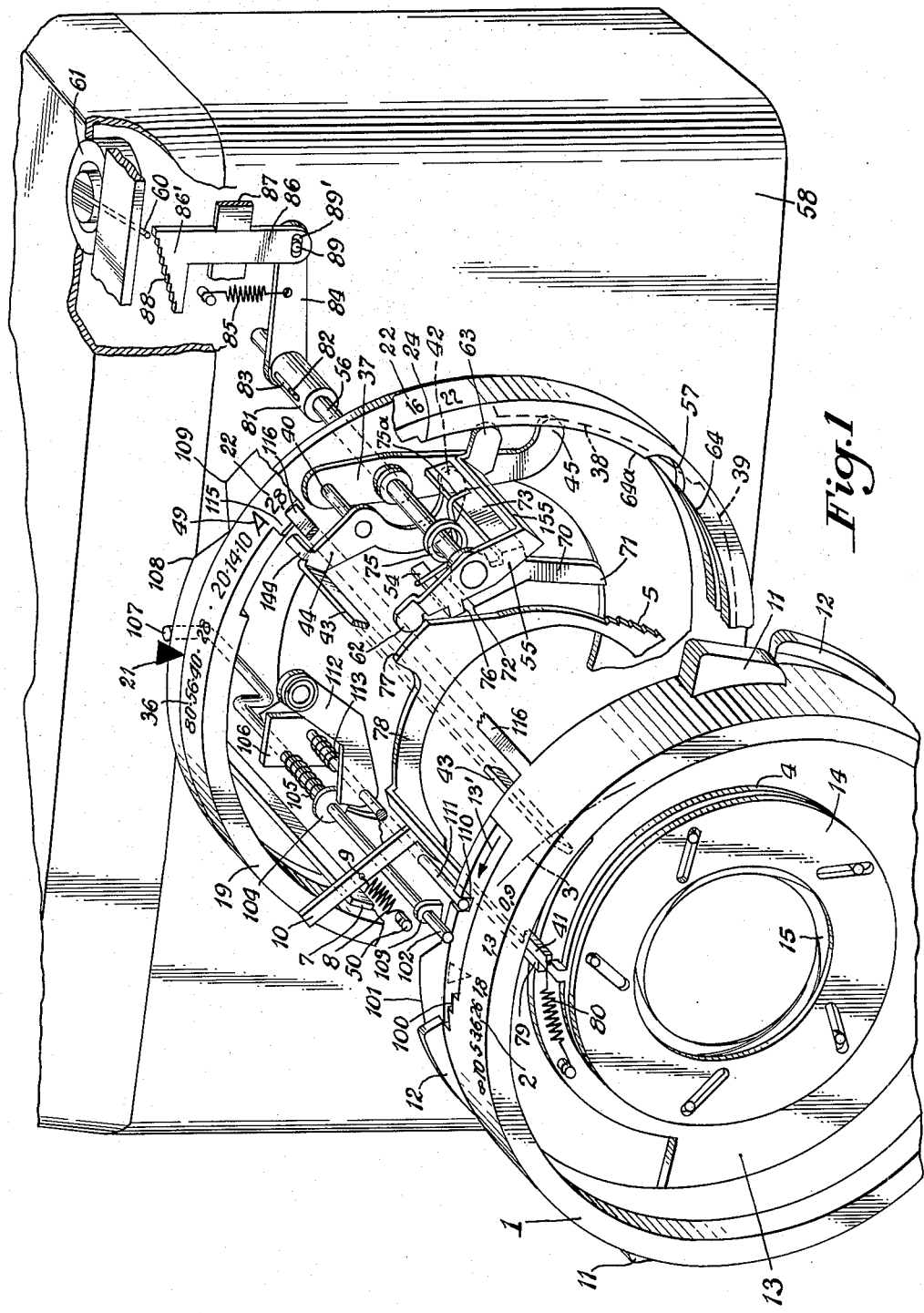

3,229,606
PHOTOGRAPHIC CAMERA OR OBJECTIVE PROVIDED WITH AUTOMATIC FLASH EXPOSURE MECHANISM
Willi Günther, Stuttgart-Mohringen, and Albert Böpple and Heinz Köppen, Stuttgart, Germany, assignors to Zeiss Ikon Aktiengesellschaft, Stuttgart, Germany
Filed Jan. 29, 1964, Ser. No. 340,965
Claims priority, application Germany, Feb. 9, 1963, Z 9,906
7 Claims. (Cl. 95—64)

The invention relates to improvements in a photographic camera or objective provided with an automatic flash exposure mechanism. The primary object of automatic flash exposure mechanisms is that a correct diaphragm aperture is automatically formed in dependence of the adjusted values of guide number and distance without necessitating any photographic calculations before making an exposure.

Photographic cameras are known which are provided with several operating ranges, such as a flash exposure range, an operating range for a manual adjustment or a preselection of the diaphragm, an operating range for an automatic adjustment of the exposure, and which as a further improvement are provided in the flash exposure range with an automatically adjustable flash exposure mechanism.

For the purpose of adjusting the camera to the different operating ranges, there is provided a so called actuating ring on which are arranged a guide number scale for the flash exposure range and a diaphragm scale for the manual setting of the diaphragm, and, furthermore, a mark for the operating range of the automatic flash exposure. This actuating ring is rotatably adjustable relative to a stationary index. A distance adjusting ring is expediently arranged adjacent said actuating ring so that its distance scale values may be positioned opposite the same stationary index. In order to assure the formation of a correct diaphragm aperture in each individual automatic operating range, there are provided pivotally mounted intermediate transfer elements which are arranged between the actuating ring and the distance adjusting ring, or between the scanning device for the pointer of the exposure meter and the diaphragm cage, respectively. These intermediate transfer elements combine and store the adjusted guide number and distance values, and the exposure value respectively, and feed these values into a diaphragm mechanism, as the case may be either in automatic diaphragms or in pressure acuated diaphragms, by direct engagement of the diaphragm control ring, or by arresting the rotation of the latter when it has been set into a reverse motion by the release of the camera. For a more detailed description of photographic cameras of this type, attention is called by way of example to United States Letters Patent No. 3,074,331, dated January 22, 1963, and to Köppen and Günther's copending United States patent application Serial No. 166,169, filed January 15, 1962 and allowed December 18, 1963.

It is an object of the invention to make improvements in photographic cameras of this type and provide the same with automatic adjustment limiting devices for preventing misexposures. The invention proceeds from photographic cameras and objectives in which the diaphragm aperture is automatically formed in dependence of the guide number and distance adjustment, and in which the intervals of the guide number adjusting member are made to correspond wholly or to a substantial portion of the scale to the uneven intervals of the scale of the distance adjusting member. The invention further provides the camera with abutment systems arranged between the adjusting members for the guide number and the distance. Such abutment systems in the simplest case may consist of invariable mutual stops, or in the case of mere partial conformance of the guide number scale with the distance scale may consist of an invariable stop and a variable abutment mechanism which have the effect that border line values of diaphragm apertures are not exceeded and that the adjustment of distances which would lead to misexposures is automatically prevented.

The invention relates particularly to photographic cameras with interchangeable objectives, i.e. of individual lens members or of complete objectives, and in which the guide number adjustment member is provided on a part of the camera which is not exchangeable, while the distance adjustment member is arranged on the exchangeable objective or exchangeable part of the objective, respectively.

Preferably, the part not exchanged contains the devices which serve for producing the different operating ranges of the camera or of the objective, in particular, those means and elements which adjust the camera for the automatic flash exposure range, but in addition the means and elements for operating the automatic exposure range and the manual diaphragm adjustment range may also be included, provided these operating ranges are at all present. In actual practice a device may be preferred —as far as the automatic flash exposure mechanism and the automatic limiting device connected therewith for preventing misexposures is concerned—in which the guide number scale corresponds to the uneven intervals of the distance scale not over its entire length but merely over the most important portion of the scale, for instance between the guide number values 20 to 80. This still has the advantage that with respect to the automatic distance limitation at one side there is an invariable stop available between the guide number adjusting member and the distance adjusting member, while the variable abutment system which serves for limitation at the other side may be attached with but little effort. This abutment system may for instance consist of only a few abutment steps provided on the distance adjusting ring, which steps cooperate with a pin which is adapted to change its position and is displaced by a control cam provided on the guide number adjusting member for actuating or operating the different ranges of the camera, respectively. In this way the number of abutment steps on the distance adjusting member depends on the number of the guide number scale values which do not correspond to the uneven intervals of the distance scale but still are evenly spaced (retention of the linear scale character). In practice these may be the guide number valves 14 and 10.

The automatic limiting device is of major importance for the operation of the automatic flash exposure range because it prevents positively the adjustment to guide number and distance value combinations which exceed the optical possibilities of the lens system in use or which do no longer comply with the flash exposure equation.

Guide Number: Distance=Diaphragm Aperture

The entire or partial adaptation of the guide number scale intervals to the uneven distance scale intervals opens an especially simple way for the automatic limiting device which has invariable or fixed abutments on both sides between the guide number adjusting member and the distance adjusting member available, or at least one invariable abutment at one side between these two members which preferably are formed by rings. It is the advantage of the present invention to have the cameras and photographic objectives provided with said automatic limiting device further developed to the point that now also exchangeable objectives may be introduced.

The unilaterally limiting mutual abutment consists preferably of a fixed projection on the actuating ring and of a projection fixedly arranged on the distance adjusting ring. Both projections cooperate with each other in the sense of stop and counterstop and both are so shaped and arranged, respectively, that they block the actuating ring and the distance adjusting ring toward one side when such guide number and distance value has been adjusted which would result for instance in a diaphragm aperture f:22, so as to prevent the formation of a diaphragm aperture which would exceed the aforementioned border line value.

In all exchangeable objectives to be used within the scope of the invention for flash exposures the pitch of the distance adjustment path in that distance adjustment range which is to cooperate with the non-linear guide number range of the guide number scale has to be so determined that in every flash exposure distance range which is usable in dependence of the focal length of the exchangeable objective the scale values and intervals between the respective scale values and guide number scale values are uniformly spaced.

It is a further object of the invention to employ the projection on the actuating ring for an additional task, which is the prevention of the adjustability of the guide number scale range on the actuating ring in exchangeable objectives which owing to their focal length are not suited for making flash exposures. In such a case the exchangeable objective is provided on its fixed bayonet mount with a projection which cooperates with the projection on the actuating ring in the sense of stop and counterstop, and which is so arranged and shaped respectively, that it blocks the guide number scale range.

Figure 2:
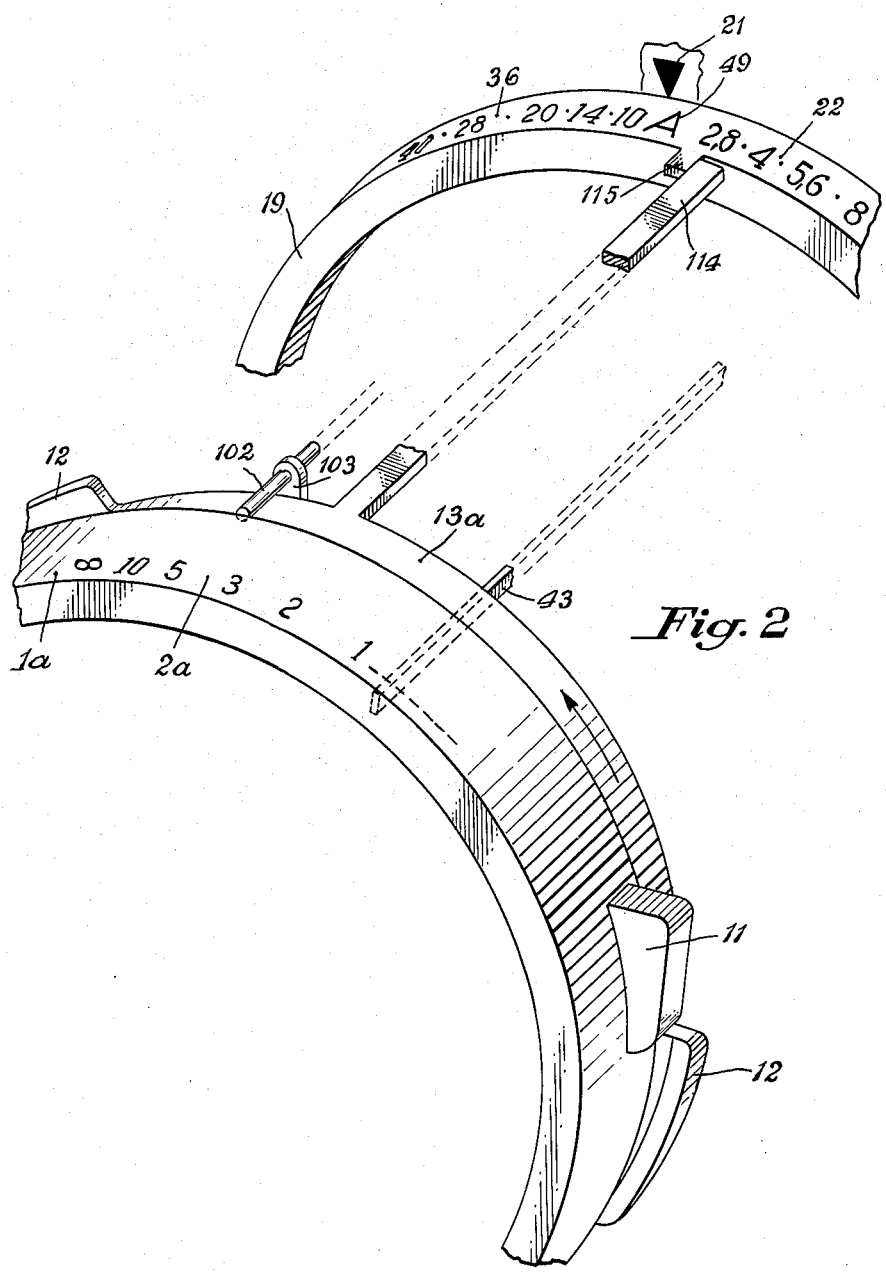

These and other features of the invention will now be described with reference to the accompanying drawings, in which:

FIG. 1 illustrates diagrammatically in a perspective and an exploded view one embodiment of a camera of of the invention, and FIG. 2 illustrates in a similar perspective view a few details of the invention.

Referring to FIG. 1, the camera casing is designated with 58, while the numerals 1 and 19 refer to adjusting rings, namely a distance adjusting ring 1 and an actuating ring 19 for switching the camera to the individual operating ranges. The distance adjusting ring 1 is arranged at the exchangeable lens member or the exchangeable objective, respectively, and has on its outer circumference a distance scale 2. The actuating ring 19 is mounted rotatably adjustable on the camera and is provided on its outer circumference with three serially arranged scales, namely a guide number scale 36, a single mark A designated with 49, and a diaphragm scale 22. The mark A belongs to the automatic exposure mechanism. The manually rotatable distance adjusting ring 1 is also provided on its outer circumference with adjusting handles 11 and with bayonet projections 12. A part of the lens mount of the exchaneable lens is designated with 13. There is further provided on the camera or on a stationary part thereof an index 21 which is common to all scales. The direction of attachment is counterclockwise and is indicated by an arrow 13a on the part 13 of the mount of the exchangeable objective.

The diaphragm mechanism arranged in the exchangeable member or in the exchangeable objective, respectively, is provided with a fixed diaphragm cage 14 and a rotatable diaphragm cage 4 effecting the opening and closing of the diaphragm segments 15. The diaphragm cage 4 is controlled in its adjustment by an intermediate ring 78 arranged on the camera casing, which ring 78 is connected with the diaphragm cage 4 by a coupling rod 79 extending parallel to the optical axis and engaging an abutment stop 41 on the diaphragm cage 4. A circumferentially extending spring 80 tends to rotate the diaphragm cage 4 in the direction of closing of the diaphragm segments, i.e. in counterclockwise direction. The intermediate ring 78 is also provided with a radial arm 10 which is engaged by a spring 8 fastened between a point 9 on the radial arm 10 and a fixed point 50. When the shutter is tensioned, the ring 78 against the action of the spring 8 is kept in a position which ensures a fully open diaphragm aperture by a shutter operated locking member 7 which upon release of the camera jumps into a position for permitting the diaphragm mechanism to make its return movement.

The distance adjusting ring 1 is provided on its inner circumference with a deflecting and compensating cam 3 which when small distances are adjusted projects rather pronounced toward the optical axis and becomes less steep when greater distance values are adjusted. The actuating ring 19 is provided at its inner circumference with a deflection cam 38 which corresponds to the guide numbers to be adjusted. That part of the cam 38 which projects more toward the optical axis corresponds to the higher guide numbers, while the more receding part of the cam 38 corresponds to the range of lower guide numbers.

These cams 3 and 38, respectively, are in cooperation with intermediate elements having the shape of scanning levers which register the adjusted distance and guide number in their rotative position and transfer these values to a control member which stores all adjusted and scanned values and upon camera release supplies these values to the diaphragm mechanism for the purpose of forming the required diaphragm aperture.

The deflecting cam 3 on the distance adjusting ring 1 engages a rod-like lateral projection 43 on the scanning lever 44 which carries a shaft 40 as its axis of rotation. The deflecting cam 38 on the actuating ring 19 engages a scanning lever 37 which has the shaft 56 as its supporting axis. The scanning lever 37 is rotatably mounted between its two ends and is so shaped that it has a lower end 45 which is able to cooperate with the cam 38 and that it carries at its upper end the shaft 40 on which the scanning lever 44 is supported.

As will be seen from the drawing, deflections of the scanning lever 37 caused by a rotative adjustment of the ring 19 to a different guide number value results in a rotative movement of this lever 37 about the axis of the shaft 56 and in a bodily displacement of the lever 44 because the rotative axis of this lever 44 is carried by the lever 37. If the lever 37, for instance, as a result of the adjustment of the ring 19 to another guide number performs a clockwise rotation, then the entire shaft 40 will be bodily displaced in the same direction. The lever 44, however, since it engages with its lateral scanning projection 43 the cam 3 on the ring 1 performs a pivotal movement about the shaft 40 in the opposite direction, i.e. counterclockwise. This means that the lower end 42 of the lever 44 moves upwardly.

As stated before, the lateral projection 43 on the distance scanning lever 44 scans the distance adjusting ring 1 when the camera is adjusted to the range of the automatic flash exposure mechanism. If small distance values are adjusted, the scanning projection 43 in accordance with the deflection of the cam 3 is moved counterclockwise, namely in the direction toward the optical axis, and consequently the lower end 42 of the lever 44 moves upwardly. It will be noted that an adjustment to high guide numbers and small distance values will bring about a counterclockwise rotation of the scanning lever 44, while the adjustment of large distance values and small guide numbers proceeding from the position as illustrated in the drawing will effect a clockwise rotation of the lever 44.

Owing to the fact that the axis of rotation of the scanning lever 44 is carried by the other scanning lever 37, the scanned values of both the guide number and the distance are stored in the lever 44. Strictly speaking, the position of the lever end 42 represents the sum of the adjusted guide number and distance values. Thus, the lever end 42 is qualified to control an adjusting member which in cooperation with the diaphragm mechanism determines the diaphragm aperture for the range of the automatic flash exposure.

The control of such an adjusting member by the lever end 42 is made possible in that the lever end 42 is engaged by a lateral arm 73 on a catch member 70 serving as an adjusting member for the diaphragm mechanism; this catch member 70 is provided at one of its ends with a tooth-like structure 71. The catch member 70 is loosely rotatablly mounted on the same supporting shaft 56 which forms already the supporting axis for the likewise loosely rotatably mounted scanning lever 37. The supporting shaft 56 forms a part of the scanning device for the pointer position of the measuring instrument of the exposure meter which when the camera is adjusted for automatic exposure determines by means of the same catch member 70 the size of the diaphragm aperture. This scanning device consists essentially of two interconnected levers 84, 86 held together at one of their ends by a pin-slot connection 89, 89'. The vertically extending lever 86 is guided for vertical movement in a guide 87. The upper end of the lever 86 is provided with an enlargement 86' having a series of abutment steps 88 which cooperate with the movable pointer 60 of the measuring instrument 61. A sleeve 81 on the shaft 56 carries the lever 84 and by a pin-slot connection 82, 83 is operatively connected with the shaft 56, even though the latter may move axially upon axial adjustment of the camera objective. A spring 85 engaging the lever 84 tends to pull the scanning device upwardly and to impart a counterclockwise rotation to the shaft 56.

The automatic exposure mechanism is further provided with a control lever 55 which is fixedly mounted between its ends on the shaft 56. This control lever 55 has a lower scanning end 63 on a rectangularly offset portion 155, an upper scanning end 62 and a lateral bearing lug 54 which is engaged by one end of a torsion spring 75 wound about the shaft 56. The other end 75a of the torsion spring 75 bears against a lateral projection 73 of the catch member 70. This torsion spring 75 urges the lever end 62 against a radial cam-like projection 77 on an intermediate ring 78 which extends concentrically about the optical axis in the same manner as the other rings 1 and 19. As a result the lower scanning end 63 of the lever 55 is urged against the cam surfaces 64, 64a on the inner circumference of the actuating ring 19. Furthermore, the spring 75 via the coupling 73, 42 has the effect that the scanning projection 43 of the lever 44 is pressed against the cam 3 on the ring 1 and the scanning end 45 of the lever 37 is pressed against the cam 38 on the ring 19. Finally, the spring 75 also holds the catch tooth 71 of the catch member 70 in its operative direction toward the intermediate ring 78.

The intermediate ring 78 is also provided on its outer circumference with a series of abutment steps 5 with approximately radially arranged shoulders. This series of steps 5 forms together with the catch member 70 a movement limiting device which permits the catch member 70 to limit the rotative movements forced upon it when the intermediate ring 78 is released and rotates rearwardly or counterclockwise by the spring 8. If, for instance, the catch member 70 or its tooth-like end 71, respectively, is only a short distance away from the steps 5 as a result of the adjustment of the ring 1 to a large distance and of the ring 19 to a small guide number, the ring 78 and therewith the diaphragm cage 4, upon release of the camera, will be stopped in their return run already after a short distance, which means that the diaphragm was not able to close or to close only to an immaterial extent. If, however, the rings 1 and 19 respectively are adjusted to a high guide number and to a small distance value, then the catch tooth 71 will be positioned farther away from the steps 5. Thus, during the return movement one of the steps 5 will engage the catch tooth 71 only after a long rotative path and this results in the closing of the diaphragm down to a small aperture value.

As described previously, the lever end 63 of the control lever 55 engages the actuating ring 19 at its inner cam faces 64, 64a; between these circumferentially spaced cam faces 64, 64a is arranged a concave recess 57 into which the lever end 63 may drop. While the cam faces 64, 64a constitute the disconnecting surfaces for the automatic exposure mechanism, which are effective when either the automatic flash exposure range is operative or when the manual diaphragm setting range is operative, the recess 57 acts as a connecting cam for the automatic exposure mechanism. When the lever end 63 engages the recess 57, the previously effective blocking of the movement of the control lever 55 and the shaft 56 is eliminated.

It also has been pointed out before that the upper lever end 62 engages the cam-like projection 77 on the outer circumference of the ring 78 which also results in a blocking of the scanning device, i.e. the shaft 56 and the elements 84 to 89. This blocking, however, takes place only in the tensioned condition of the camera. Upon release of the camera the ring 78 begins to rotate counterclockwise, the lever end 62 slides off the projection 77 and the lever 55 becomes freely movable. This means that when the camera is tensioned the scanning device 84 to 89 is ineffective. The pointer 60 can swing freely and can move to the position which corresponds to the prevailing light conditions. Only upon a camera release the scanning device becomes operative, the lever 86 with the scanning steps 80 jumps upwardly and comes to rest in a position which depends on the position of the pointer. Obviously, there is provided a conventional clamping device for the pointer which becomes effective previously, but since this clamping is known, it is not illustrated. The scanned position of the scanning device results in a certain rotative position of the shaft 56 which in turn effects a corresponding action and adjustment of the catch member 70 via the coupling faces 72, 76.

For the purpose of manually adjusting the diaphragm, the diaphragm scale 22 is moved opposite the fixed index 21. The inner circumference of the ring 19 is provided with a disconnecting cam 39 which cooperates with the scanning head 45 of the lever 37. In adjusting the ring 19 to gradually smaller diaphragm aperture values, namely by rotating the diaphragm scale 22 counterclockwise from $f:2$ to $f:22$, the scanning head 45 moves along parts of the cam 39 which progressively project toward the optical axis so that the lever 37 performs a clockwise rotation about its shaft 56. The radius arc 24 on the actuating ring 19 which projects towards the optical axis serves for the cooperation with the scanning lever 44 in the range of the manual diaphragm adjustment or preselection, respectively. A lateral projection 144 at the upper end of the lever 44 engages this arc 24 and thereby provides a support for the lever 44. If now the lever 37 moves clockwise, the lever 44 on account of its mounting on the axis 40 and the support against the radius arc 24 moves counterclockwise which has the effect that the catch member 70, 71 resiliently engaging the lever 44 moves away from the series of steps 5. At a diaphragm aperture $f:22$ for instance the distance between catch member and steps 5 would be so great that an engagement of these two elements would take place only after a complete return run of the rotatable diaphragm cage 4, i.e. after the diaphragm segments 15 have been closed.

By the radius arc 24 it is made sure that the lateral projection 43 of the lever 44 which in the automatic flash exposure range cooperates with the deflecting cam 3 is moved away from this cam 3 so far that an influence of the selected distance on the formation of the diaphragm is not possible.

The guide number scale 36 between the guide number values 20 and 80 corresponds to the unevenly spaced intervals of the distance scale 2. FIG. 1 shows that the intervals between the guide numbers 20, 28, 40, 56 and 80 of the scale are not uniform, but at first are quite large and decrease with increasing guide number values. The portion of the guide number scale comprising the guide numbers 10 and 14 has, however, retained its linear character in that the intervals between the individual scale values remain uniform.

In accordance with the invention the actuating ring 19 is provided with a lateral projection 115 which cooperates with a lateral projection 116 provided on the distance adjusting ring 1 and extending rearwardly, i.e. toward the camera. This abutment system consisting of the two projections 115 and 116 constitutes the unilaterally acting stop between the actuating ring 19 and the distance adjusting ring 1 and this stop becomes effective when by a corresponding adjustment of a combination of guide number values and distance values a diaphragm aperture border-line value has been reached. In the illustrated example (FIG. 1), the guide number value 40 has been moved in registration with the index 21 and is combined with the distance value 1.8 m. which results according to the flash exposure equation in a diaphragm aperture of $f:22$. This flash aperture of $f:22$ may be assumed to be the limit value the objective is able to furnish. It will be noted that the stops 115, 116 prevent an adjustment to a higher guide number which would require a still smaller diaphragm aperture, independently of the distance adjustment. The stops 115, 116 have the effect that any higher guide numbers are adjustable only by a simultaneous adjustment of the distance adjusting ring, whereby during this coupled rotation of the two rings pairs of values of guide number and distance pass the index which all result in the diaphragm aperture limit value of $f:22$.

An adjustment of the actuating ring 19 towards smaller guide number values is of course possible; likewise, the distance adjusting ring may be separately adjusted toward larger distance values. Such separate adjustments are permissible for the reason that each of them will result in a diaphragm aperture which is larger than $f:22$.

In order to eliminate misexposures in the automatic flash exposure range which are due to a selection of incompatible guide number and distance values, there is provided another abutment system which is effective toward the other side. This limiting but variable abutment system consists of the ratchet 100 on the distance adjusting ring 1 and of the counter stop 102 which is formed by a control rod projecting from the actuating ring 19. This counterstop 102 is provided with a fixed collar 104, a spring 105 and a scanning end 107 which latter slidingly engages a control cam 108 on one side of the actuating ring 19. The counter stop 102 is mounted in the fixed mount portion 106 and the arrangement is such that the spring 105 tends to hold the scanning end 107 resiliently against the control cam 108. The counter stop 102 in dependence of the deflections received by the control cam 108 cooperates with the ratchet 100 on the distance adjusting ring 1 in such a manner that its axial displacement in a forward direction, i.e. toward the ratchet, is the larger the smaller the adjusted guide number is. The cam 108 essentially begins to act only at those guide number values which are lower than the guide number 20. If ever smaller guide numbers lower than 20 are adjusted, the projection 102 moves lengthwise more and more toward the abutment steps 100 which has the result that an ever sooner engagement with one of the abutment steps takes place. This means that with the adjustment to smaller guide numbers distance values are eliminated which can no longer be regarded as close-up focusing values. It is obvious that with little flash energy flash exposures of objects in a substantial distance cannot be successful. Consequently, in order to prevent misexposures, the larger distance values have to be increasingly eliminated from adjustability when simultaneously smaller and smaller guide numbers are selected.

The control cam 108 drops to its lowest position in connection with the lowest adjustable guide number and, after leaving the automatic flash exposure range, rises again to finally constitute a constant radius arc. This rise which is designated with 109 occurs, as mentioned, after the departure from the automatic flash exposure range and has the effect that in the automatic exposure range A and in the manual diaphragm setting range 22 the counter stop 102 is positioned so far away from the steps 100 on the ring 1 that no engagement between these two stop members is possible. Therewith it is assured that in the other operating ranges of the camera diaphragm apertures may be formed which are independent of the adjusted distance. The bayonet ring of the exchangeable objective is provided with a locking recess 110 which is engaged by a locking rod 111 after completion of the attachment of the objective to the camera. This locking rod 111 is also mounted in the fixed mount portion 106 and is surrounded by a spring 113 which is arranged between the mount portion 106 and a handle 112 mounted on the locking rod 111. If the exchangeable lens is to be detached, the locking rod 111 has to be disengaged from the locking slot 110 by laterally urging the handle 112 against the action of the spring 113, whereupon the bayonet lock may be operated.

The counter stop 102 is provided near its front end with a projection 103 which cooperates with a cam 101 projecting rearwardly from the bayonet mount 13. This device has the purpose to move the counterstop 102 during the detachment automatically so far in the direction of the camera that any engagement with the steps 100 on the distance adjusting ring 1 or with a protruding part on the bayonet mount ring is prevented.

The operation of this arrangement is as follows: With the counterclockwise attachment of the exchangeable objective or lens member the coupling projections 41, 79 come into engagement with one another and the scanning projection 43 engages the distance deflecting cam 3. Furthermore, the locking rod 111 has dropped into the slot 110.

When the camera is adjusted to automatic flash exposures, the scanning levers 44 and 37 conforming to the shape of the deflecting cams 3 and 38 are deflected. Hereby the counterclockwise rotation of the lever 44 which, as previously stated, combines the values of the deflections in its lever end 42, is the larger, the smaller the adjusted distance and the higher is the adjusted guide number. The upward movement of the lever end 42 resulting from this counterclockwise rotation causes a counterclockwise moving of the catch member 70 so that the catch tooth 71 moves more and more away from the series of steps 5. This means that upon release of the camera and return run of the ring 78 the engagement of the steps 5 and the catch tooth 71 takes a prolonged period of time so that a correspondingly small diaphragm aperture is formed.

When the ring 19 is rotatably adjusted to long distances and low guide numbers, reverse deflections of the scanning levers 37 and 44 will take place. Both these scanning levers perform clockwise movements which result in a movement of the catch member 70 also in clockwise direction. The catch tooth 71 therefore is moved closely to the series of steps 5 so that after a short return run it comes to an engagement between the tooth 71 and one of the steps 5 which means that the diaphragm has not been able to close at all or only to a small degree.

When the camera is adjusted for automatic flash exposures, all other operating ranges of the camera will be ineffective. The scanning device of the automatic exposure mechanism is locked in that the control lever 55 engages the cam faces 64 or 64a, respectively, on the ring 19 and is therefore ineffective. The shaft 56 thus serves only as a supporting axis for the scanning lever 37 and the catch member 70.

If the camera is now adjusted for using the range of the automatic exposure mechanism by moving the mark "A" on the actuating ring opposite the index 21, then the lever end 63 of the control lever 55 will drop into the recess 57 on the ring 19 and the control lever 55 along with the shaft 56 and the scanning device 84 to 89 are ready for action. As long as the camera is tensioned, the just mentioned parts will remain inactive because the other lever end 62 of the lever 55 still engages the cam 77 on the ring 78. Only upon release of the camera and the ensuing return run of the ring 78 in counterclockwise direction the lever end 62 will slide off the projection 77 and the scanning device 84 to 89 is able to operate in conformance with the power of the spring 85 and to cause one of the steps 88 to come into engagement with the deflected pointer 60 of the measuring instrument. The control lever 55 serves not only for connecting and disconnecting the automatic exposure mechanism but also for the immediate activation of the catch member 70 (touching surfaces 72, 76) and directs the catch member 70 into a position which corresponds to the position of the scanning device. After a shorter or longer return run of the ring 78 the catch tooth 71 will engage one of the steps 5 and the required diaphragm aperture is formed. During the retension of the camera the lever end 62 again slides upon the elevated cam face 77 and the connection between the pointer 60 and the steps 88 is interrupted.

When the camera is adjusted for manual diaphragm adjustment or preselection, respectively, by rotating the diaphragm scale 22 opposite the index 21, the scanning end 45 of the lever 37 engages the deflecting cam 39, and the lateral projection 144 on the upper end of the lever 44 engages the radius arc 24 on the ring 19. As stated previously, the scanning lever 37 rotates clockwise as a result of the shape of the cam 39 when the ring 19 is progressively adjusted to smaller diaphragm values. Simultaneously, the lever 44 connected with the lever 37 by the shaft 40 performs a counterclockwise rotation about the lateral projection 144 which bears against the concentric surface 24. The catch member 70, 71 being resiliently connected with the lever 44 follows the movement of the coupling end 42 and by counterclockwise rotating about the shaft 56 moves away from the steps 5. It will be noted that the smallest adjustable diaphragm aperture of $f:22$ causes the catch tooth 71 to assume its largest distance from the steps 5 so that consequently upon release of the camera the intermediate ring 78 and the rotatable diaphragm cage 4 coupled with it are able to perform a complete return movement before it comes to an engagement between the catch tooth 71 and the last step of the series of steps 5. Thus the diaphragm is closed as far as possible.

Furthermore, by the sliding of the scanning projection 144 along the radius arc 24 the scanning end 43 of the lever 44 will be lifted away from the distance deflection cam 3 on the ring 1 to such an extent that the formation of the diaphragm aperture will not be influenced by the selected distance.

The operation of the abutment systems for preventing misexposures in the flash exposure range has essentially been explained in connection with the description of the individual structural elements. With the illustrated adjustment of the guide number 40 and the distance value 1.8 m., i.e. values which result in an extreme diaphragm aperture, the projection 115 fixedly arranged at the actuating ring 19 and the projection 116 fixedly arranged at the distance ring 1 come into engagement with each other and no longer permit any separate rotation of the said rings which may lead to still higher guide number values or still smaller distance values, respectively. This would be possible only by the coupled rotation of these two rings 1 and 19. If the actuating ring 19 is clockwise rotated, this will result in an adjustment to higher guide numbers, but at the same time the distance ring 1 is also rotated and moves distance values to the index 21 which require increasingly larger distance adjustments. However, all these value pairs of guide number and distance result in the same aperture limit value of $f:22$. The minimum aperture ratio of $f:22$ will not be exceeded.

Identical therewith is the result of any attempt to adjust the camera to smaller distance values by counterclockwise rotating the distance adjusting ring 1. This, too, is only possible by a corresponding rotation of the actuating ring 19 which will be adjusted to smaller and smaller guide number values which in combination with the respective distance values again will bring about a diaphragm aperture of $f:22$.

When the actuating ring 19 is rotated to adjust the camera to smaller guide number values, the variable abutment system comprising the steps 100 on the distance adjusting ring and the abutment rod 102 becomes effective. It blocks distance values on the distance adjusting ring 1 which in combination with the adjusted low guide numbers woud be too large as to assure sufficiently exposed flash pictures. In general, distance values over 10 meter are eliminated by the last step because the flash light is not strong enough to sufficiently illuminate objects beyond said distance. By the engagement of the abutment rod 102 with the other steps it is made sure that distance values are eliminated which in combination with the selected low guide numbers would require a maximum diaphragm aperture ratio of the lens which the same is not able to furnish. For instance, a distance adjustability of 5 meter in combination with the guide number 10 would require a diaphragm aperture $f:2$ which exceeds the maximum aperture of $f:2.8$. The abutment system 100, 102 has the effect that with guide number 14 adjusted, distance values larger than 5 m. are no longer adjustable, and that with guide number 10 only distance values of 3.5 m. and lower can be used.

FIG. 2 illustrates how the projection 115 on the actuating ring 19 can be empolyed to block the adjustment of the automatic flash exposure ring 36 on the actuating ring 19 in connection with exchangeable objectives which on account of their too small or too large focal lengths do not produce satisfactory flash exposures. This blocking action of the projection 115 is effected in that on the exchangeable objective a lateral projection 114 is provided, for instance on its bayonet mount portion 13. This projection 114 acts as a counterstop for the projection 115 and is so shaped and arranged on the exchangeable member that upon completing the attachment of the objective to the camera it prevents the adjustment of the actuating ring 19 to the guide number adjusting range 36, In order to accomplish this, the attachment angle of the bayonet lock on the objective mount obviously has to be larger than the circumferential distance which the scale to be eliminated occupies on the circumference of the actuating ring. Compared with the projection 115 on the distance adjusting ring 1 in FIG. 1, the projection 114 on the mount 13a in FIG. 2 is circumferentially displaced and is in alignment with the space between the numbers 2 and 3 of the distance scale 2a on the distance adjusting ring 1a.

What we claim is:

1. A photographic camera provided for having attached thereto any one of a number of interchangeable objectives, each objective having an adjustable diaphragm, a diaphragm aperture adjusting mechanism including means for preselecting the diaphragm aperture to be adjusted, said camera also being provided with an automatic exposure adjusting means, an actuating ring 19 extending concentrically about the optical axis of said objective when the latter is attached to the camera for selectively adjusting the camera to a plurality of operating ranges, namely to a flash exposure range provided with guide numbers, an automatic exposure range and a manually adjustable diaphragm aperture range, a distance adjusting ring 1 having a distance scale thereon and extending concentrically about the optical axis of said objective and a fixed index on said camera for cooperating with said actuating ring and indicating the operating range which has been selected for operation and also for cooperating with said distance scale to indicate for which distance said distance adjusting ring has been set, said actuating ring being permanently attached for rotatable adjustment on said camera, said distance adjusting ring being mounted for rotatable adjustment on said interchangeable objective to be removed with the latter when said objective is detached from the camera, and cooperating abutment means on said actuating ring and said distance adjusting ring for preventing in said flash exposure range a rotatable adjustment of said actuating ring to guide number values which at the adjusted distance of said distance adjusting ring would result in incorrect flash exposures.

2. A photographic camera according to claim 1, in which said abutment means comprises a fixed projection 115 on said actuating ring 19 and a fixed projection 116 on said distance adjusting ring 1.

3. A photographic camera provided for having attached thereto any one of a number of interchangeable objectives, each objective having an adjustable diaphragm, a diaphragm aperture adjusting mechanism including means for preselecting the diaphragm aperture to be adjusted, said camera also being provided with an automatic exposure adjusting means, an actuating ring 19 extending concentrically about the optical axis of said objective when the latter is attached to the camera for selectively adjusting the camera to a plurality of operating ranges, namely a flash exposure range provided with guide numbers, an automatic exposure range and a manually adjustable diaphragm aperture range, a distance adjusting ring 1 having a distance scale thereon and extending concentrically about the optical axis of said objective and a fixed index on said camera for cooperating with said actuating ring and indicating the operating range which has been selected for operation and also for cooperating with said distance scale to indicate for which distance said distance adjusting ring has been set, said actuating ring being permanently attached for rotatable adjustment on said camera, said distance adjusting ring being mounted for rotatable adjustment on said interchangeable objective to be removed with the latter when said objective is detached from the camera, and cooperating abutment means on said actuating ring and said distance adjusting ring for preventing in said flash exposure range a rotatable adjustment of said actuating ring to guide number values which at the adjusted distance of said distance adjusting ring would result in incorrect flash exposures, said abutment means comprising a fixed projection 115 on said actuating ring 19 and a fixed projection 116 on said distance adjusting ring 1, and another abutment means circumferentially displaced from said first mentioned abutment means, said other abutment means comprising a projection with a series of steps 100 on said distance adjusting ring and an adjustable member 102 which is slidably mounted parallel to the optical axis of the objective and controlled in its slidable movement by a cam 108 on said actuating ring.

4. A photographic camera according to claim 3, in which said arm 108 which controls the adjustment of said adjustable member is provided with a disconnecting cam portion 109 which moves said adjustable member away from said steps 100 when the actuating ring is rotatably adjusted to a position in which said flash exposure range is inoperative.

5. A photographic camera according to claim 3, including a projection 103 on said adjustable member 102 which cooperates with a control cam 101 on the mount of said interchangeable objective, said control cam moving said adjustable member 102 into such a position during the attachment of the objective that said control member does not prevent the complete attachment of the latter.

6. A photographic camera according to claim 1, in which in all of the interchangeable objectives suitable for flash exposures the pitch of the distance adjusting thread in that portion of the distance adjusting range which is intended for cooperating with the non-uniform guide number scale range is constructed in such a manner that depending upon the focal length of the selected interchangeable objective the scale values and spaces between the scale lines in the respective distance scale values and guide number values are uniform within the usable flash exposure distance range.

7. A photographic camera according to claim 1, in which said abutment means comprises a fixed projection on said actuating ring 19 and a fixed projection 116 on said distance adjusting ring, said fixed projection on said actuating ring 19 cooperating in interchangeable objectives which are not suitable for making satisfactory flash exposures with a projection 114 on the mount of such objectives so that an adjustment of the actuating ring to its flash exposure range is prevented after said objective has been attached to the camera.

References Cited by the Examiner
UNITED STATES PATENTS
2,805,609  9/1957  Nerwin _____ 94—45

JOHN M. HORAN, *Primary Examiner.*